Patented Aug. 31, 1937

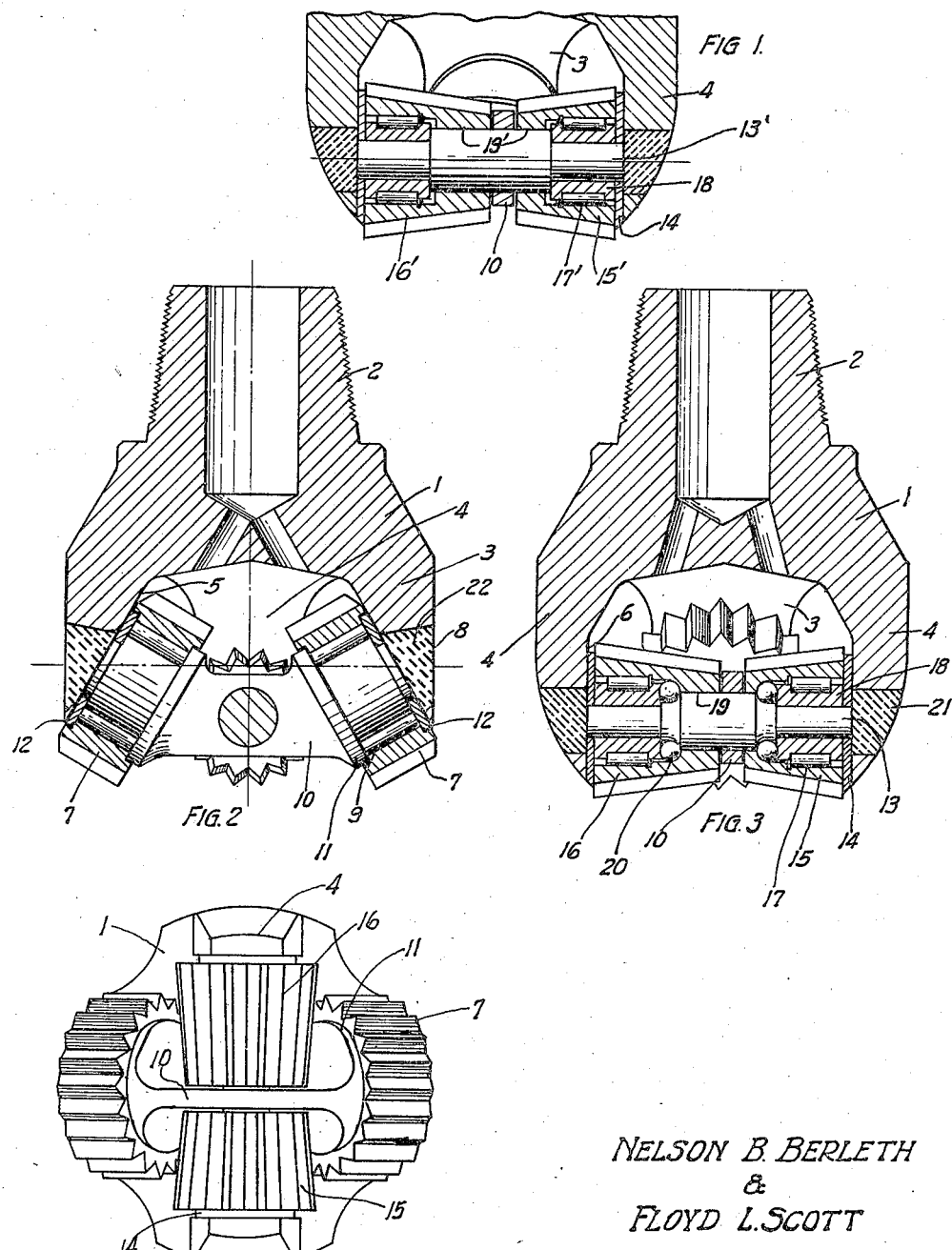

2,091,889

UNITED STATES PATENT OFFICE 2,091,889

BEARING FOR WELL DRILLS

Floyd L. Scott and Nelson B. Berleth, Houston, Tex.

Application January 25, 1936, Serial No. 60,792

9 Claims. (Cl. 255—71)

The invention relates to well drills for drilling deep wells. It has particular application to the bearings employed on drills of the cross roller type.

It is an object of the invention to provide a bearing which will wear for comparatively long periods of time.

It is another object to provide a bushing in combination with a roller bearing, both bushing and rollers being rotatable.

It is another object to provide antifriction means on the bearings of the cross roller cutters which tend to take up the outward end thrust of the cutter.

It is a further object to provide a sturdy construction of cross roller shaft and bearings which will withstand the heavy wear to which they are subjected.

In the drawing, herewith, Fig. 1 is a broken section of the lower end of a drill employing the invention.

Fig. 2 is a central longitudinal section through a drill head showing the side cutters and their support.

Fig. 3 is a similar longitudinal section showing the cross roller cutters and shafts, in an embodiment slightly different from that shown in Fig. 1.

Fig. 4 is a bottom plan view of the drill bit.

The cross roller drill upon which our bearings are shown is of the usual form. It has a head 1 with an upwardly tapered shank 2 threaded for attachment to a drill collar. There are two pairs of forwardly projecting legs 3, 3, and 4, 4. The inner faces of the legs 3, 3 have upwardly and inwardly inclined faces 5. The inner faces 6 of the legs 4 are approximately vertical.

The side cutters 7 are mounted upon roller bearings 9 adapted to roll upon shafts 8 formed upon the outer ends of a bridge 10. The bridge is flattened and offset between its ends as seen in Fig. 3, and a flange 11 is formed thereon to define the inner side of the bearing for the cutter. The outer ends of shafts 8 are reduced in diameter to receive washers 12 which form a thrust surface at the outer ends of the bearing rollers 9.

The cross roller shaft 13 in Fig. 3 and 13' in Fig. 1 is shown as extending transversely across between the legs 3 and through an opening through the bridge 10. It is of large diameter between its ends, the bearing support being reduced in external diameter adjacent the ends of the shaft. The ends of the shaft are approximately flush with the inner sides of legs 4 and a washer 14 is mounted on each end of the shaft to form additional weld area for the bond and additional support to the shaft after welding. The washers also offer protection to the body of the bit head which is used for many sets of cutters.

The cutter 16 in Fig. 3 and 16' in Fig. 1 is longer than cutter 15 or 15' so as to cut the center of the hole. Each cutter is mounted on roller bearings 17 which in turn are mounted on sleeve-shaped bushings 18 which may creep upon the reduced portions of the shaft 13 or 13'. The cutter has its inner bearing surface recessed to fit over the roller bearing but the end adjacent the bridge is of smaller interior diameter at 19 in Fig. 3, and 19' in Fig. 1 to engage the larger diameter of the shaft. In the Fig. 1 embodiment the thrust longitudinally of the cutter is taken by the washer 14 and the bridge 10. In the Fig. 3 construction the outer thrust is taken by a ball bearing 20 placed upon the shaft at the inner end of bushing 18. The rollers 17, or 17' roll in raceways recessed in the outer surfaces of the bushings 18.

The cross roller shaft may be extended transversely through the bridge and the cutters and bearings mounted thereon; after which the complete assembly of cutters, shaft and bridge is moved upwardly into position with the ends of the bridge and shaft approximately flush with the inner walls of the legs. The said ends as well as washers are then welded to the legs by bonds of welding metal 21 on the cross roller shaft and 22 on the bridge. The legs are formed with openings to receive this welding metal. The weld metal also secures the washers 12 and 14 in position so that the shaft, bridge and washers become an integral stationary part of the head, and assist materially in supporting loads transmitted to the cutters.

The cutter bearings are designed for strength and efficiency. The cutters 15 and 16 upon the cross roller shaft being constrained by their mounting to roll in a circle much smaller than they otherwise would, have a marked twisting and scraping action upon the bottom of the hole. They tend to move outwardly along the cross roller shaft. This outward thrust is received upon the balls 20 and marked wear upon the washers and head is therefore avoided and the rolling of the cutter in use is assured. The rollers 17 and 17' receive little end thrust while drilling and are arranged to take the upward thrust from the formation in drilling, in an effective manner so that the bearings will wear longer than will the cutting area on the outer peripheries of the cutters. This long wear upon the cutter bearings is prolonged to a marked extent by the bushings 18 which are rotatable upon the shafts. The upward thrust of the formation tends to bring the wear upon the lower side only of the bushing. Where the bushing is also rotatable it will have a slow creeping action about the shaft and will present successively new surfaces downwardly and the wear will be uniform on all sides, thus prolonging the life of the bearing.

Bushings are not employed upon the side cutter bearings. They do not wear so excessively and the full length rollers 9 take all the wear so that the bearings will endure as long as the teeth upon the cutters.

What we claim as new is:

1. A cross roller bit including a head, two pairs of forwardly extending legs, a bridge between one pair of legs, a shaft extending crosswise of said bridge and supported by the other pair of legs, side cutters on said bridge adjacent said first-named legs, cross roller cutters rotatable on said shaft, bushings for said cross roller cutters, said bushings being rotatable on said shaft, and roller bearings for said cutters adapted to roll in recesses in said bushings.

2. A cross roller bit including a head, two pairs of forwardly extending legs, a bridge between one pair of legs, a shaft extending crosswise of said bridge and supported by the other pair of legs, side cutters on said bridge adjacent said first-named legs, cross roller cutters rotatable on said shaft, bushings for said cross roller cutters, said bushings being rotatable on said shaft, a row of balls on each of said shafts at the inner ends of said bushings, and roller bearings for said cutters adapted to roll in recesses in said bushings.

3. A cross roller bit including a head, side cutters rotatable at opposite sides in said head, a cross roller shaft having its ends reduced in diameter relative to its intermediate portion, bushings rotatable on the reduced portion of said shaft, an annular roller raceway in each of said bushings, rollers in said raceways, and cross roller cutters mounted on said rollers.

4. A cross roller bit including a head, side cutters rotatable at opposite sides in said head, a cross roller shaft having its ends reduced in diameter relative to its intermediate portion, bushings rotatable on the reduced portion of said shaft, an annular roller raceway in each of said bushings, rollers in said raceways, and cross roller cutters mounted on said rollers, said cutters extending inwardly beyond said bushings and having a bearing also upon said intermediate portion of said shaft.

5. A cross roller bit including a head, side cutters rotatable at opposite sides in said head, a cross roller shaft having its ends reduced in diameter relative to its intermediate portion, bushings rotatable on the reduced portion of said shaft, an annular roller raceway in each of said bushings, rollers in said raceways, cross roller cutters on said shafts mounted to bear on said rollers, the inner ends of said cross roller cutters extending beyond said bushings and bearing upon said shaft, and rows of balls at the inner ends of said bushings to take the outward thrust of said cutters.

6. A rotary well drill including a head, a shaft mounted at the forward end of said head, a bushing rotatable on said shaft, rollers adapted to roll in a raceway in said bushing, and a cutter shaped to fit over said rollers and roll thereon.

7. A rotary well drill including a head, a shaft mounted at the forward end of said head, a bushing rotatable on said shaft, rollers adapted to roll in a raceway in said bushing, and a cutter shaped to fit over said rollers and roll thereon, one end of said cutter extending beyond said bushing and reduced in inner diameter to bear upon said cutter shaft.

8. A rotary well drill including a head, a shaft mounted at the forward end of said head, a bushing rotatable on said shaft, rollers adapted to roll in a raceway in said bushing, and a cutter shaped to fit over said rollers and roll thereon, one end of said cutter extending beyond said bushing and reduced in inner diameter to bear upon said shaft, and a row of balls on said shaft between said reduced inner end of said cutter and said bushing forming an end thrust taking bearing.

9. A rotary well drill including a head, a shaft mounted at the forward end of said head, a bushing rotatable on said shaft, rollers adapted to roll in a raceway in said bushing, and a cutter shaped to fit over said rollers and roll thereon, one end of said cutter extending beyond said bushing and reduced in inner diameter to bear upon said shaft, a thrust washer at one end of said bushing and a row of balls on said shaft at the other end of said bushing.

FLOYD L. SCOTT.
NELSON B. BERLETH.